(12) United States Patent
Riveiro Insua et al.

(10) Patent No.: US 7,460,553 B2
(45) Date of Patent: Dec. 2, 2008

(54) PROCESS FOR MULTIPLE ACCESS AND MULTIPLE TRANSMISSION OF DATA IN A MULTI-USER SYSTEM FOR THE POINT TO MULTIPOINT DIGITAL TRANSMISSION OF DATA OVER THE ELECTRICITY NETWORK

(75) Inventors: Juan Carlos Riveiro Insua, Valencia (ES); Jorge Vicente Blasco Claret, Valencia (ES); FelicianoS Gómez Martínez, Valencia (ES); David Ruiz López, Valencia (ES); Nils Hakan Fouren, Barcelona (ES); Luis Manuel Torres Cantón, Valencia (ES); Francisco Javier Jiménez Marquina, Valencia (ES); Carlos Pardo Vidal, Valencia (ES)

(73) Assignee: Diseno De Sistemas En Silicio, S.A., Paterna, (Valencia) (ES)

( * ) Notice: Subject to any disclaimer, the term of this patent is extended or adjusted under 35 U.S.C. 154(b) by 940 days.

(21) Appl. No.: 10/686,046

(22) Filed: Oct. 15, 2003

(65) Prior Publication Data

US 2004/0136393 A1 Jul. 15, 2004

Related U.S. Application Data

(63) Continuation of application No. PCT/ES02/00187, filed on Apr. 17, 2002.

(30) Foreign Application Priority Data

Apr. 19, 2001 (ES) ................................. 200100916

(51) Int. Cl.
*H04J 3/16* (2006.01)

(52) U.S. Cl. .......................... 370/437; 370/210; 370/468
(58) Field of Classification Search ....................... None
See application file for complete search history.

(56) References Cited

U.S. PATENT DOCUMENTS

| 5,630,204 | A | * | 5/1997 | Hylton et al. | ................ 725/116 |
| 6,144,292 | A | * | 11/2000 | Brown | ......................... 455/402 |
| 6,194,996 | B1 | * | 2/2001 | Okazaki et al. | ............. 370/482 |
| 6,275,144 | B1 | * | 8/2001 | Rumbaugh | .................. 375/259 |
| 6,373,377 | B1 | * | 4/2002 | Sacca et al. | .................. 375/257 |
| 6,492,897 | B1 | * | 12/2002 | Mowery, Jr. | ................. 455/522 |
| 6,522,626 | B1 | * | 2/2003 | Greenwood | .................. 370/208 |
| 6,549,120 | B1 | * | 4/2003 | de Buda | ...................... 370/482 |
| 6,958,680 | B2 | * | 10/2005 | Kline | .......................... 370/487 |

\* cited by examiner

*Primary Examiner*—Bob A. Phunkulh
(74) *Attorney, Agent, or Firm*—Klauber & Jackson

(57) ABSTRACT

This process applies to a number of user kits (A, B, . . . X) and a head-end kit (1) communicating over the electricity network (2) using an upstream channel and a downstream channel. In essence, the process comprises accessing by multiple user kits (A, B, . . . X) in the upstream channel and the sending of multiple information frames by the head-end (1) in the downstream channel simultaneously applying OFDMA/TDMA/CDMA multiplexing and dynamically assigning each carrier so as to maximize transmission capacity in both the upstream and downstream channels. In turn, the process allows the adjustment of the quality of service according to the type of information and the user that requires the transmission and the dynamic allocation of bandwidth through constantly calculating the signal-to-noise ratio.

25 Claims, 6 Drawing Sheets

PROCESS FOR MULTIPLE ACCESS AND MULTIPLE TRANSMISSION OF DATA IN A MULTI-USER SYSTEM FOR THE POINT TO MULTIPOINT DIGITAL TRANSMISSION OF DATA OVER THE ELECTRICITY NETWORK

RELATED APPLICATIONS

The present application is a continuation of co-pending PCT Application No. PCT/ES02/00187, filed Apr. 17, 2002, which in turn, claims priority from Spanish Application Ser. No. 200100916, filed Apr. 19, 2001. Applicants claim the benefits of 35 U.S.C. §120 as to the PCT application and priority under 35 U.S.C. §119 as to said Spanish application, and the entire disclosures of both applications are incorporated herein by reference in their entireties.

OBJECT OF THE INVENTION

The present invention, as described in the title, refers to a process for multiple access and multiple transmission of data in a multi-user system for the point to multipoint digital transmission of data over the electricity network. This process specifies the methods chosen to control access to the electricity network as a means of transmission via the downstream channel (from a head-end kit to various user kits) and, upstream channel (from the user kits to the head-end kit). The process of this invention has been designed specifically for a system such as that described in the invention with Patent application Number 200003024, entitled: "point to multipoint system and process for the transmission over the electricity network of digital data", however, this does not rule out its use in other systems and structures that support such an application.

The main purpose of the present invention is to maximize the transmission capacity, or put another way, the bandwidth that each user can extract from an electricity distribution network.

The technical field of the invention lies in the telecommunications sector, more specifically, in the field of two-way communication between a head-end and various users using the electricity network as the means of transmission.

BACKGROUND OF THE INVENTION

The use of the electricity network as a means of communication is know in the prior art, but due to its poor performance, its use as a data transmission network has been limited to point-to-point communication at very low speeds.

This is due, among other reasons, to the fact that in the electricity network the connection and disconnection of apparatus generate voltage peaks and impedance variations on the line causing serious loss of signal that varies in function of frequency and time.

Furthermore, various obstacles impede the establishment of communication between a head-end and multiple users, due to the many impedance changes in the different frequencies and the production of reflections that cause the signal received to be a combination of the transmitted signal and a series of echoes that circulate through the electricity network with different attenuations and delays for each one of the users on the received signal.

Furthermore, attenuation, noise, and channel response vary dynamically both in frequency and in time.

All these obstacles limited the use of the electricity network for full-duplex, high-speed point to multipoint communication, until the appearance of the patent P-200003024, as referred to previously, that supports a system where various user kits and a head-end are in two-way communication via the electricity network, one channel being the upstream from the users to the head-end, and the other the downstream going from the head-end to the user kits, including a medium access control module (MAC) in each one of the kits to maximize the quantity of information that the user kits can transmit and minimize time latency in these user kits while the division of the electricity network for the upstream and downstream channels is made by means of duplexing by division in frequency and/or by means of duplexing by division in time and where both head-end and user kits include the means to adapt the corresponding digital transmission to the electricity network.

The system supported by the patent P-200003024 as already mentioned, adequately resolves the inconveniences referred to previously, being nevertheless capable of incorporating diverse processes, among which is the process described in the present invention.

On the other hand, other means of communication for the transmission of data are known in the background art, such as the use of the twisted pair in telephones to establish point-to-point or point to multipoint communication.

In this context we cite U.S. Pat. No. 5,673,290 wherein a method of transmission point-to-point is described that consists of communication via a downstream channel determined by a link from the head-end to various different users, and communication via the upstream channel determined by a link from the user to the head-end, whereby the communication is made possible using a discrete digital multi tone (DMT) transmission system and providing the coding of the digital data and the modulation of the codified data over the discrete multi-tone signal.

Furthermore, the communication line is supervised to determine at least one line quality parameter, including noise levels in each one, and includes a multitude of subchannels each one corresponding to an associated sub carrier tone. The modulation system is designed to take various factors into account including detected line quality parameters, the parameters of sub-channel gains, and a masking parameter of permissible power when modulating the discrete multi tone signal. The modulation system is also capable of dynamically updating the subcarriers used and the quantity of data transmitted in each sub carrier during transmission to adapt in real time to changes in individual subcarriers.

In applications susceptible to interference, the associated bandwidths can be simply masked or silenced to prevent interference in either direction, and therefore, the signals are transmitted by subcarriers with frequencies above or below the most significant noise levels.

Furthermore, in this U.S. Pat. No. 5,673,290 the transmission occurs in base band and the conjugated real hermitian transformation of the transmissible information is used (real Fast Fourier Transform). Due to the characteristics already described, this transmission method cannot be applied to transmission over the electricity network.

Furthermore, the method described in this US Patent refers to point-to-point communication, therefore, neither its use over the electricity network nor the possibility for full duplex point to multipoint communication can be inferred.

On the other hand, point to multipoint communication systems exist such as that described in the PCT Patent Number WO96/37062 where the transmission line can be coaxial cable, fibre optic or similar, which use orthogonal frequency division multiple access modulation system (OFDM), a modulation system that is well known in the background art, and to which a cyclic prefix is added to each OFDM symbol to alleviate the defects of the multi path propagation as is well known in the state of the art. The use of the cyclic prefix with the OFDM modulation can be encompassed by the DMT modulation used in the previous document and is also widely used in the state of the art.

This PCT document describes how channels are established over respective sub-carrier groups, so that each user is assigned a specific group of tones so that the hardware and the complexity involved in realizing the discrete Fourier transformation is substantially reduced, however, as a fixed system it does not allow the assignation of different subcarriers to the users depending on the prevailing frequency and time conditions in each channel, even when, as described in the case of U.S. Pat. No. 5,673,290, the individual subcarriers can be connected or disconnected to avoid interferences.

Furthermore, it uses a remote loop to correct the frequency of local oscillators of the various user modems.

We can also cite U.S. Pat. No. 5,815,488 and U.S. Pat. No. 5,828,660 regarding point to multipoint communication.

These documents do not have a description of the adaptation for the transmission using the electricity network.

Furthermore, none of the documents previously cited concern the transmission for multiple users, or how to maximize the throughput of the upstream and downstream channels in the electricity network.

DESCRIPTION OF THE INVENTION

To achieve the objectives and avoid the inconveniences indicated in the previous paragraphs, the current invention comprises a process for multiple access and the multiple transmission of data for a multi-user system for point to multipoint digital transmission of data over the electricity network. This system includes various user kits and a head-end kit in two way communication over the electricity network, where: the upstream channel runs from the, user kits to the head-end and the downstream channel runs from the head-end to the user kits; each one of the kits contains a medium access controller (MAC) to maximize the quantity of information that the user kits can transmit and to minimize time latency in these kits; and where the electricity network is divided for the upstream and downstream channels by frequency division duplexing (FDD) and/or time division duplexing (TDD).

The novelty of the current process comprises:

access by various user kits in the upstream channel and the simultaneous sending of various information packets by the head-end in the downstream channel by means of multiplexing OFDMA/TDMA/CDMA (multiplexing by orthogonal frequency division, multiplexing by time division and/or multiplexing by code division);

criteria to dynamically assign each carrier in the OFDM system (multiplexing by orthogonal frequency division) to the user and among the users with information to send at that moment with greater transmission capacity at this carrier (more bits per carrier or better signal-to-noise ratio) so as to maximize the transmission capacity in both the upstream and downstream channels, that is, to equalize or level the response in frequency observed by the head-end in both emission and in reception;

adjust quality of service (QoS) depending on the type of information and the users that require the transmission, where this quality of services is adaptable according to the frequency response at different moments and to the different distances between the user kits and head-end kit;

dynamically assign available bandwidth between the various communication requests by constantly calculating and monitoring the signal-to-noise ratio observed by the user kits and by the head-end kit in the whole bandwidth of the system.

With this the transmission resources are distributed (that is all the carriers in the OFDM system) according to the transmission needs of each user at each moment, the quality of service parameters established for the user, the criteria to maximize the total capacity of the system and the criteria to minimize transmission latency, using for this the redistribution of the carriers of one symbol between the users (OFDMA), in time (TDMA), that is symbol to symbol, and by code (CDMA), optimising said redistribution by constant monitoring of the quality parameters for the electricity line, which vary over time.

The process of this invention presents the means to maximize, that is, equalize or level the frequency response given by the head-end kit both in emission and reception, due to the fact that the electricity line acts as a selective channel in frequency between one point and another, causing certain frequencies to demonstrate greater signal-to-noise ratio and therefore greater transmission capacity than others, so that for some users some frequencies will be those that demonstrate greater signal-to-noise ratio, while for other users, the frequencies will be different. The means to maximize, as mentioned, preferably consist of:

specification of a vector space of equal size to the number of carriers in the OFDM channel, where the elements that make up this space are the number of bits per carrier that each user can see in each one of the carriers or the dimension of the constellation used in each carrier.

$$v_i = [v_{i1}, v_{i2} \ldots v_{in}];$$

where N is the total number of carriers utilized in the communication link which refers to the vector and $v_{ix}$ represents the number of usable bits per carrier in the communications from or to the user $_i$ (depending on which link is referred to) in the carrier $_x$ from the point of view of the head-end.

distribution of the carriers between the users with information to send so as to maximize the norm one for this vector: $\|v\|$, where v is the vector of bits per carrier (or dimension of the constellation or each carrier) that each head-end kit uses in the current symbol, both in the upstream and the downstream;

grouping of the total number of carriers N, of the upstream and downstream in subchannels of M carriers to simplify the calculation of the algorithm and the implementation, so as to reduce the dimension of vector space, generating a vector space with the dimensions N/M, where the values of the coordinates is the sum of all the carriers in the sub-channel, and giving as a result the capacity of transmission per OFDM symbol that each user sees in the each sub channel;

adjust the width of the subchannels to the coherent bandwidth, defined as the difference of the frequencies between the frequency position of the first and last carrier in which the variation in the frequency response in these carriers is less than a certain threshold.

According to a preferred embodiment of the invention, the head-end MAC includes an arbitration block or arbiter responsible for the dynamic distribution of bandwidth in the upstream and downstream channels for the various communications from the user kits, where the criteria used by this arbiter to dynamically assign the transmission bandwidth are those previously described, and for which the following means are employed:

- packet oriented transmission, preceded by a header indicating to which user the transmission is directed and in which conditions;
- upstream and downstream channels are divided into subchannels so that users are multiplexed to maximize bandwidth transmission for both the upstream and downstream channels;
- dynamic assignation of carriers to the various users varying over time, so that:
    - in the downstream link the headers of each packet sent by the sub channel indicate, among other things, the destination, the size and the constellation used, therefore the users must be capable of detecting and understanding all the headers received by whatever sub channel, while only demodulating the information from the packet directed to them when they know the vector of bits per carrier used in the modulation;
    - in the upstream link, apart from the division in subchannels adjusted to the coherent bandwidth, division in time occurs such that a SLOT is defined as the number of symbols in the upstream channel between two allocation messages of these SLOTS (SAM), and which constitute the units used by the arbiter to assign resources to the users, where these resources are periodically assigned by sending SLOT allocation messages (known as SAM) by the downstream link towards a user kit, which may include on one or more SLOTS and which are periodically sent a determined number of samples before the SLOTS to which they refer (that is, they precede them temporarily), so that if the number of symbols of a SLOT is small then the latency floor that can be obtained is also small but the complexity of the system is greater as is the cost of the transmission capacity in the upstream channel in resources allocation messages (SAM);
- continuous measuring of the signal-to-noise ratio for each user in all channels both upstream as well as downstream, to continually update the capacity of the transmission for all users in each one of the subchannels;
- continuous information regarding which users wish to make transmission and in what quantities by means of interrogation (POLLING) SLOTS and resource petition messages (MPR) respectively, where the upper layers of the head-end in the upstream are those that inform the arbiter of the quantity of information pending transmission and from which users; and,
- information on the QoS (bandwidth and latency) defined for each user in function of the channel capacity and the number of users hanging from the head-end kit, so that the number of SLOTS continuously assigned to a single user can be limited in cases where various users want to transmit at a given moment, thereby maintaining equality of access for users in the upstream connection.

When the head-end kit wants to transmit to one or more user kits via the downstream channel, the arbiter block dynamically distributes bandwidth, using one or more of the subchannels referred to, and it advises of the users how to use this or these subchannels by means of the headers in the information packets sent by the subchannels, so that each user kit decodes the corresponding data when it detects that one of the said headers refers to a packet directed to it (a user kit can receive more than one packet from various distinct subchannels), the header being able to indicate the transmission of a new packet to the user or that the sub channel where the header is sent will be used to accelerate the transmission of a packet sent previously by another sub channel or subchannels to the same user, by means of aggregating the carriers of this new sub channel and those already used for the transmission, of the previous packet.

Headers sent by the subchannels in the downstream connection are modulated preferably with modulations that have limited signal-to-noise ratio requirements for their decoding, preferably DPSK (differential phase modulation) and/or QPSK (quadrature phase modulation), along with correction codes/error detection and frequency diversity (sending of the same information in different carriers) and/or time diversity (sending the same information at different moments) to increase the probability of correctly decoding the said header.

Furthermore, the headers already referred to include all the information necessary for the appropriate information packet, such that the destination, packet types, the use of diversification in frequency and/or in time, if the packet is destined for one user or for various users (MULTICAST mode) and/or all users (BROADCAST mode), the modulation used for each carrier, if FEC redundancy has been employed (code correction redundancy/error detection) to protect the information packet, and/or if the sub channel to which the header is sent will be used to accelerate the transmission of information from a packet sent previously by another sub channel, or other information.

On the other hand, the SLOTS previously mentioned, into which the upstream connection is divided, may be used, by the user kits for:

- the transmission of requests to interrogation messages (POLLING);
- the transmission of resource petition messages (MPR),
- the transmission of data including one or all of the following:
    - synchronization sequences,
    - equalization sequences,
    - sequences to estimate signal-to-noise ratio, and/or
    - data on information that the user wants to send to the head-end.

In the upstream connection the arbiter includes the means to provide each user kit the most adequate bandwidth in variable form, offering more or less SLOTS according to parameters such as the amount of information to be sent, the quality of service requested, the type of information to be sent, the signal-to-noise ratio observed by the users in the SLOTS conceded, and others, by means of an optimum assignation algorithm of SLOTS and communicating the decisions taken by said arbiter to the user kits using SAM messages.

The method used to communicate decisions on the distribution of SLOTS in the upstream connection as taken by the arbiter of the head-end is the sending of assignation messages SAM by the downstream connection to each user kit, and that can include information on one or various SLOTS, is sent periodically and always with a determined number of samples before the SLOTS to which they refer (that is, they temporarily precede them) including at least:

- the indication of the user or users to which each SLOT is given,
- the use to which each SLOT is to be put,
- the number of symbols inside the SLOT that will be given to each user,
- the number of the symbol starting from which each user may use the SLOT,
- information on the modulation that must be used for the transmission of data, preferable QPSK or a constellation negotiated with the head-end kit for a determined error rate in function of the signal-to-noise ratio of the channel;

it may also include:
confirmation of reception of resource petition messages (MPR),
restriction of access to determined user kits,
the correction of detours in the temporal transmission window of the user kits,
information on power control,
the type and number of data to be sent by the user, that is if 0 or more equalization or synchronization symbols are to be sent and an estimation of the sound/noise and/or information data.

Preferably these SAM messages are coded with some extra protection against errors, such as codes with a greater capacity for correction/detection of errors, diversity in frequency or time, and other systems.

Furthermore, in the downstream channel, the arbiter undertakes the distribution function taking into account parameters such as the signal-to-noise ratios (or the frequency response) that the user kits observe in the subchannels, the message priority, the quantity of information, among others. The users decode the headers sent via the downstream connection and decide if they must take the data sent by the same sub channel as the header, starting from the information on the destination, including said header.

The arbiter may order the use of one or more additional subchannels for the corresponding dispatch, or to increase the bandwidth of a user, the objective being to speed up the transmission of the packet referred to, assigning more than one sub channel to transmit more than one packet of information at a time, indicating either of these decisions by means of the header in the messages dispatched.

The arbiter may distribute the users on the various subchannels, in both the upstream and the downstream, such that the bandwidth used is maximised at each moment, based on the frequency response that each user may observe in the various subchannels.

In the upstream and downstream channels, at the time of assigning resources the arbiter uses QoS as one of the criteria to minimize latency, that is, each user kit transmits as soon as possible after placing an access request in the upstream connection, or that a packet is transmitted from the head-end kit to a user as quickly as possible.

The MPR message, previously referred to, is preferably a relatively short control message informing when a user kit wants to transmit data and as an option, on the size of the information block to be sent and the quality of service required by the user kit during the following moments:
when a SAM message received by the user kit indicates that the next SLOT assigned to said kit is the last in a series of data transmission SLOTS, the user kit will use part of the SLOT to send an MPR message in case that it has more data to transmit,
when the user kit has not more data to send and still has SLOTS assigned, in this case the corresponding MPR message will indicate to the head-end not to assign more SLOTS and to reassign the remaining SLOTS to other user kits,
when a user kit is assigned a SLOT (by means of a SAM) dedicated to the petition of resources (MPR), so that the user kit(s) that want to transmit, will send their MPR in this SLOT (using a small part of this randomly or by means of a determined algorithm that taking into account the type of user, the type of information and other parameters); and so that the head-end kit detects possible collisions when various user kits coincide in the petition of resources in the same zone of the SLOT, such collisions are resolved by means of algorithms known in the prior art or by leaving the user kits retransmit their positions in later interventions until competition between users is resolved.

POLLING SLOTS allow a maximum number of users to be questioned regarding whether or not they have information to transmit by means of an interrogation algorithm the purpose being that the same user kits are not always those questioned when said maximum number is surpassed, and are included in the head-end as a means to classify the user kits into various categories depending on the activity that the users demonstrate, and to obtain this information the head-end assigns interrogation SLOTS (POLLING) to those users on whose activity it requires information and these respond in the part of the SLOT allocated to them when they have information to send.

When a user kit has data to send it waits until a message (SAM) announces that one of the following SLOTS is destined for POLLING or MPR, so that if it receives a POLLING SAM the following steps are undertaken:
the user kits verifies certain bits in the SAM that indicate if it belongs or not to the group of users than may use the next POLLING SLOT,
the SAM message indicates the positions in which the user kit must reply to the resource request, these positions being determined by the head-end kit that constantly monitors the signal-to-noise ratio and that can be seen by user kit in the various carriers (available frequencies for the upstream communication);
the POLLING SLOT is divided into various valid zones that are small portions of time/frequency, and the user kits select the zone indicated by the SAM so as to avoid a collision of petitions;
the user kit sends a POLLING message in the selected zone; and
if the said POLLING has been received in the head-end kit, the user kit will later receive SAM messages assigning SLOTS; while if it has not received them, the user kit will have to wait until there is a new POLLING SAM; however, if it has received an announcement of an MPR SLOT in a SAM, the user kit will send the MPR message in said SLOT where apart from the necessity to transmit, it indicates, preferably, the size of the information that it wants to send, the priority, the QoS required, the form in which said information may be decoded by the head-end and if it can be used to optimise the algorithm for the assignation of arbitrage SLOTS; having foreseen that if the head-end detects collision it will begin an algorithm to resolve this collision or wait for the user kits to transmit their petition in another MPR SLOT or POLLING (since the arbiter does not grant any data transmission SLOT in the following SAM).

In one preferred embodiment of the invention, the user kits follow the decisions taken by the head-end regarding the moment to transmit, the carriers to be used, the type of modulation and other parameters, according to the following process:
having correctly received the transmission requests from a user kit, the head-end assigns sufficient time/frequency SLOTS starting from an estimation made according to the activity, transmission capacity, quality of service and other parameters of the user kit that made the petition and according to the signal-to-noise ratio monitored in the sub channel, the arbiter being responsible for the distribution of SLOTS between the users that made the petition to send data with the algorithm previously mentioned;

when a user kit detects, by means of demodulation and decoding the SAM message that one or more SLOTS are destined for it, it undertakes the following operations:

checks the type of each one of the SLOTS assigned and the modulation that must be used in each carrier of each SLOT, the SAM message being responsible for the communication of this information according to that assigned by the arbiter;

calculates how many bits it will be able to transmit in total (and extracts the data from its memory), these being information on data, equalization, synchronization, estimation of sound/noise or any other combination of these, as is indicated in the SAM message assigned to this SLOT;

waits until the start symbol begins on the part of the SLOT that must transmit and undertakes the transmission of data using the modulation selected;

if any of the SLOTS assigned is of the type diversity in time or in frequency, the user kit must transmit the modulated information in secure form (preferable QPSK) repeated various times in frequency, that is to say, transmitting the same information from carrier k in the carriers k+N, k+2*N, etc, depending on the diversity used and the carriers assigned, or repeated various times at various moments (time diversity);

if the SLOT is a POLLING or MPR type the process previously mentioned is used.

The CDMA multiplexing, already referred to, includes a frequency hopping method that if applied to the carriers then user kits only use some of the carrier at the moment of transmission, according to a sequence that indicates at each instant the carriers that may be used to send information, this sequence being predefined and being capable of being generated by a pseudorandom sequence whose seed is communicated by means of SAM messages, while if the said method is applied to the subchannels, the sequence is used to indicate to the user kit which sub channel must be used to transmit at each moment in time.

The information packet headers sent by the SLOTS in the upstream connection are modulated, preferably with modulations that for decoding have low signal-to-noise ratio requirements, such as DPSK (differential phase modulation) and/or QPSK (phase modulation in quadrature), along with correction codes/error detection and frequency diversity (sending of the same information over distinct carriers) and/or time (sending the same information at different moments) to increase the probability of correct decoding.

The headers, mentioned previously, include all the information necessary on the corresponding information packet, such as information on packet type, use of frequency and/or time diversity, the modulation used to modulate the information in the packet (for example all carriers in QPSK or all carriers with the constellation fixed for a determined error task in function of the signal-to-noise ratio on the channel after each user has been negotiated with the head-end) and the FEC redundancy (code correction redundancy/error detection) with which the information in the packet is protected, among others.

The process in this invention may include a series of controls to maximize the signal-to-noise ratio for all users without penalizing any of the them during the transmission thereby allowing multiple access in the same OFDM symbol and in the upstream connection and, the transmission of multiple information packets simultaneously in the downstream connection; said controls being:

control of the injected power for each user kit;
control of the time window for each user kit;
control of the sample frequency, that is the synchronization in frequency of the user kits.

Automatic gain control and/or a power mask is used on these controls on the injected power by which the signals from the users kits arrive at the head-end with approximately the same power, so that one can work with converters A/D (analog/digital) with few bits without loosing the signal-to-noise ratio in reception.

On the other hand, the window control, as mentioned, is used to control the signals from the various users that arrive at the head-end at the same time, that is, the start of all the OFDM symbols sent arrive in the same time window at the head-end; this control is made by means of:

an adjustment in the open loop that occurs in the downstream channel, and which represents a rough adjustment in the time window and in which each user kit can see the packets that arrive via the downstream channel, and from which the samples that have to be delayed/advanced in transmission are approximately deduced so that they arrive at the head-end at the optimum moment;

an adjustment in the closed loop that occurs in the upstream channel and in the downstream by means of the SAM messages that represent a fine adjustment in the time window and in which the head-end kit detects and communicates the number of samples that must be delayed/advanced by the user kit to reach the optimum moment for transmission.

Finally, in the frequency control referred to earlier, following synchronization, each user kit knows the sample frequency used by the head-end, which it then uses to correct the transmission in the upstream channel so that frequency error in reception is null; the following methods are used to correct transmission frequency in the users kits:

residual error correction in the carriers by means of a rotor, that compensates the rotation that each carrier suffers (multiplying each carrier by the complex exponential of the desired angle); and sample frequency correction by means of a frequency corrector element (that may consist of a resampler in the digital treatment part of the system, and/or in the variable oscillator or VCXO in the analog part), it being considered that if the corresponding clocks are sufficiently precise it is not necessary to use said frequency corrector element, suffice to simply correct the residual error in the carriers with the rotor previously referred to.

The following drawings are provided to facilitate a better understanding of the present invention and while forming an integral part of the detailed description and the claims, they offer an illustrative but not limited representation of the principles of this invention.

DESCRIPTION OF AN EMBODIMENT OF THE INVENTION

Figure 1:
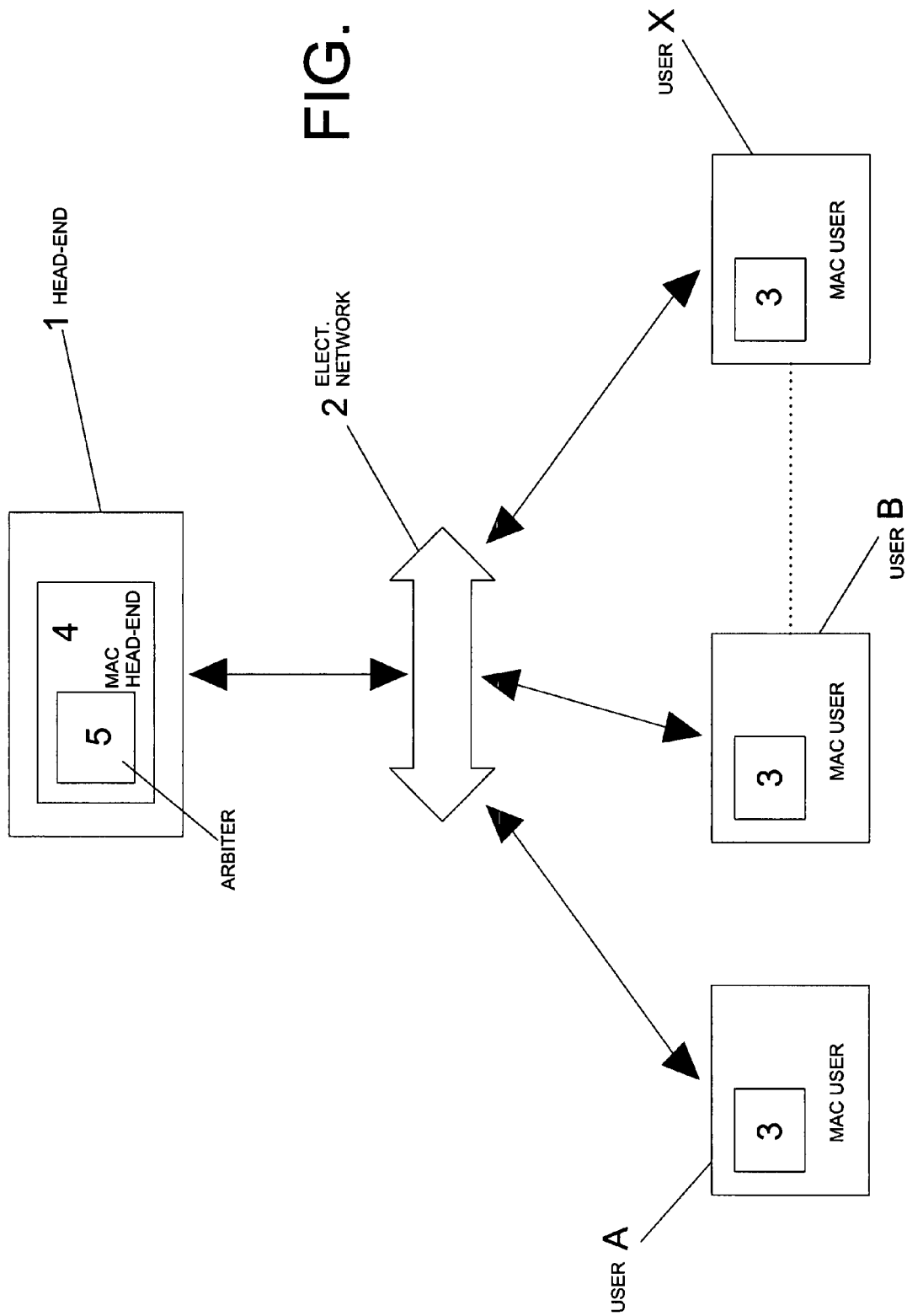
FIG. 1 schematically represents a structure or system in which the process of this invention may be applied.

The following is a description of a preferred embodiment of the invention, the numbers refer to the numeration used on the drawings.

The process used in this example applies to a system that has various user kits (A, B, . . . X) and one head-end kit (1).

These kits (A, B, . . . X) and (1) are, in two way communication over the electricity network (2); establishing an upstream channel that goes from the user kits (A, B, . . . X) to the head-end (1) as well as a downstream channel that goes from the head-end (1) kit to the user kits (A, B, . . . X).

Both the user kits (A, B, . . . X) and the head-end (1) include a medium access controller (MAC) that is represented by the number 3 for the user kits and the number 4 for the head-end kit.

By means of this MAC, the quantity of information that the user kits (A, B, . . . X) may transmit is maximized and time latency is minimized for said kits (A, B, . . . X).

To have two communication connections, an upstream connection and a downstream connection over the physical medium that is the electricity network, one must undertake frequency division (FDD=Frequency Division Duplexing) or time division (TDD=Time Division Duplexing).

The configuration described is represented in FIG. 1.

The process described in the current example has the following four essential characteristics:
  access by various user kits (A, B, . . . X) in the upstream channel and the simultaneous sending of various information packets by the head-end (1) in the downstream channel by means of multiplexing OFDMA/TDMA/CDMA (multiplexing by orthogonal frequency division, multiplexing by time division and or multiplexing by code division);
  criteria to dynamically assign each carrier in the OFDM system (multiplexing by orthogonal frequency division) to the user and between the users with information to send at that moment with greater transmission capacity per carrier (more bits per carrier or better signal-to-noise ratio) so as to maximize the transmission capacity in both the upstream and downstream channels, that is, to equalize or level the request in frequency observed by the head-end in both emission and in reception;
  adjustable quality of service (QoS) depending on the type of information and the users that require the transmission, where this quality of service is adaptable according to the frequency response at different moments and to the different distances between the user kits (A, B, . . . X) and the head-end kit (1);
  dynamic assignation of available bandwidth between the various communication requests by constant calculating and monitoring of the signal-to-noise ratio observed by the user kits (A, B, . . . X) and by the head-end kit (1) in the whole bandwidth of the system.

By means of these four characteristics the transmission resources are distributed that is all the carriers in the OFDM system according to the transmission needs of each user at each moment, the quality of service parameters established for the user, the criteria to maximize the total capacity of the system and the criteria to minimize transmission latency, using for this the redistribution of the carriers of one symbol between the users (OFDMA), in time (TDMA), that is symbol to symbol, and by code (CDMA), optimising said redistribution by constant monitoring of the quality parameters for the electricity line, which vary over time.

In the process-in this example the head-end kit (1) is responsible for the distribution of bandwidth between the user kits (A, B, . . . X) taking into account factors such as the quality of service assigned to each one of the users. The upstream channel is divided into intervals of time and frequency, known as SLOTS, represented in FIG. 2, and these SLOTS are distributed between the users that wish to transmit. An arbiter or arbiter (5) located in the MAC (4) of the head-end (1) undertakes this distribution. Information on which SLOTS must be used by each user and or which symbols of the SLOT must be used by one or more users, along with information on the type of modulation to use in the SLOTS and symbols assigned, the function of each, etc, is introduced in SLOT assignation messages known as SAM that are periodically sent by the downstream channel to all the user kits (A, B, . . . X).

The flexibility of this composite sharing allows optimum utilization of the transmission medium. A series of controls are also include for this that consist of:
  control of the injected power for each user (A, B, . . . X);
  control of the time window for each user (A, B, . . . X);
  control of the sample frequency, that is, the synchronization in frequency of the user kits (A, B, . . . X).

To dynamically distribute bandwidth in the upstream and downstream connections, these connections, or channels, are divided into a series of subchannels that are made up of groups of various carriers.

Bandwidth in the subchannels is adjusted to the characteristics of the electricity network (2), specifically that coherent bandwidth for the channel; said coherent bandwidth being defined for a multi carrier transmission systems like the difference in frequencies between the frequency position of the first and last carrier where the variation in frequency response in these carriers is less than a certain threshold (such as, for example 12 dB).

When the subchannels are adjusted to the coherent bandwidth it can be assured/that the frequency response for the carriers in this sub channel for a determined user will be enclosed. Therefore, a user will see all the carriers that make up the sub channel with a relatively stable signal-to-noise ratio.

This adjustment permits that users can be selected in function of the frequency response observed in the subchannels. Each user may be assigned optimum spectral zones so as to maximize the average bandwidth observed in each connection. Furthermore, subchannels may also be assigned to various users that observe an orthogonal frequency response one to the other (in subchannels where the user observes and low S/N, another user may observe a high S/N or vice-a-versa), so that would be possible to maximize bandwidth use.

In the best case the objective is to have such a high granulation that a sub channel consists of only one carrier. In this case complex algorithms are required that are far too costly in time and in the capacity of the process to assign users to the subchannels according to the frequency response in each sub channel, to maximize the advantage in average bandwidth. To have rapid and manageable algorithms, the connection is divided into eight or sixteen subchannels in the upstream and downstream connections, always in agreement with the limit imposed by the coherent bandwidth for the channel.

Figure 3:
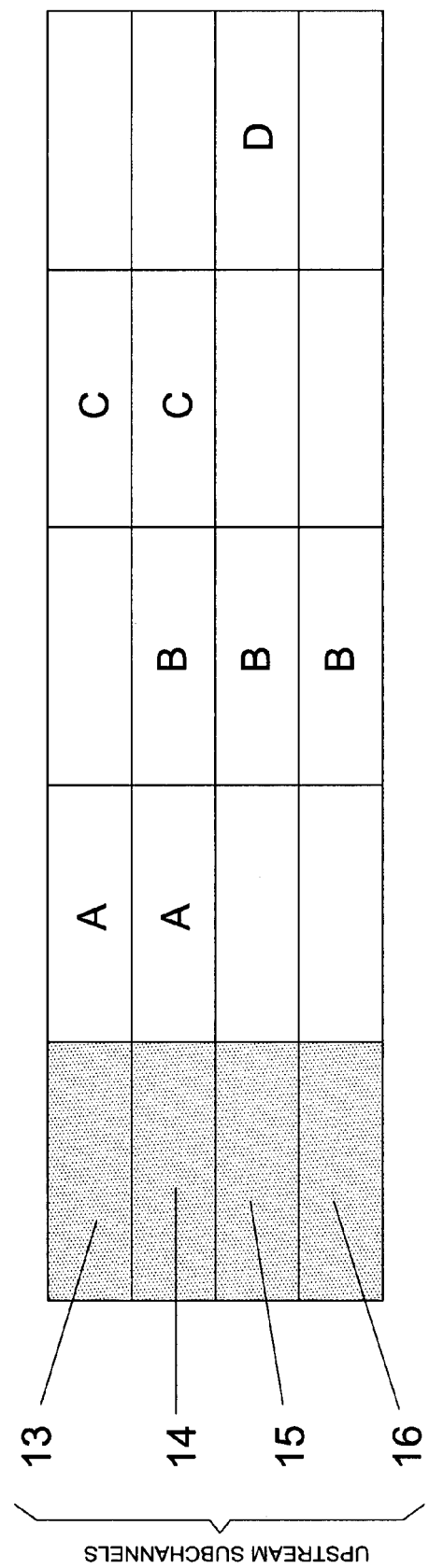
FIG. 3 schematically represents a table on the division of subchannels for the upstream or downstream channel as used by the process of the present invention.

FIG. 3 shows an example of a table that four users A, B, C and D maintain with a frequency response greater than a determined threshold for each one of the four subchannels 13, 14, 15 and 16 that the upstream channel is divided into. This table is maintained in the head-end kit (1) and is used during the distribution of bandwidth to the users, so as to maximize average bandwidth when assigning subchannels to the users that observe an orthogonal frequency response.

The table in FIG. 3 shows an example of the first criterion of distribution used. When a user wants to transmit in the upstream connection, or when the head-end wants to transmit to a user via the downstream connection, the table mentioned or one similar is used to observe in which sub channel information may be sent.

One of the most important points to optimising simultaneous communication by multiple users over the electricity network (2) is the dynamic assignation of bandwidth between the users.

To optimise assignation of the carriers to the users requires constant calculation and monitoring of frequency response or the signal-to-noise ratio of the users and the head-end kit in both communication channels. This is due to the fact that the electricity network is not a stable medium, but suffers changes in function of transference over time and depending on the distance that exists between the user in question and head-end.

The objective is always to find the optimum assignation of carriers for each user, according to the criterion of maximizing the average capacity of the communications channel, which can be achieved by maximizing the signal-to-noise ratio in the total bandwidth.

To distribute bandwidth, the users to which the communication is intended are determined. The head-end 1 knows this information for the upstream connection thanks to the resource petition messages (MPR) and the questioning of users (POLLING), while in the downstream it will know the destination of the packets to be sent.

Once the users implicated in the communication are known a table or data base of the type shown in FIG. 3 is used to determine which subchannels must be assigned to each used, the objective being to maximize transmission capacity.

To maximize, that is to equalize or level the frequency response given by the head-end 1 both in emission and reception the following steps are followed:

a vector space of equal size to the number of carriers in the OFDM channel is specified, where the elements that make up this space are the number of bits per carrier that each user can see in each one of the carriers or the dimension of the constellation used in each carrier.

$$v_i = [v_{i1}, v_{i2} \ldots v_{in}];$$

where N is the total number of carriers utilized in the communication link which refers to the vector and $v_{ix}$ represents the number of usable bits per carrier in the communications from or to the user $_i$ (depending on which link is referred to) in the carrier $_x$ from the point of view of the head-end.

carriers are distributed between the users with information to send so as to maximize the norm one for this vector: $\|v\|$, where v the vector of bits per carrier (or dimension of the constellation or each carrier) that each head-end kit uses in the current symbol, both in the upstream and the downstream;

grouping of the total number of carriers N, of the upstream and downstream in subchannels of the M carriers to simplify the calculation of the algorithm and the implementation, so as to reduce the dimension of vector space, generating a vector space with the dimensions N/M, where the values of the coordinates is the sum of all the carriers in the sub-channel, and giving as a result the capacity of transmission per OFDM symbol that each user sees in the each sub-channel;

adjust the width of the subchannels to the coherent bandwidth, defined as the difference of the frequencies between the frequency position of the first and last carrier in which the variation in the frequency response in these carriers is less than a certain threshold.

Once the head-end 1 knows the user kits (A, B, ... X) that will transmit, or those that will receive if it is the downstream channel, it observes the quality of service requirements QoS and the adequate subchannels in the table referred to previously. Finally, as a distribution criterion it uses an orthogonal algorithm and then distributes bandwidth between the most orthogonal, users (most different). In this manner the frequency response in the communication channel as observed by the head-end 1 is the most level possible.

Figure 4:
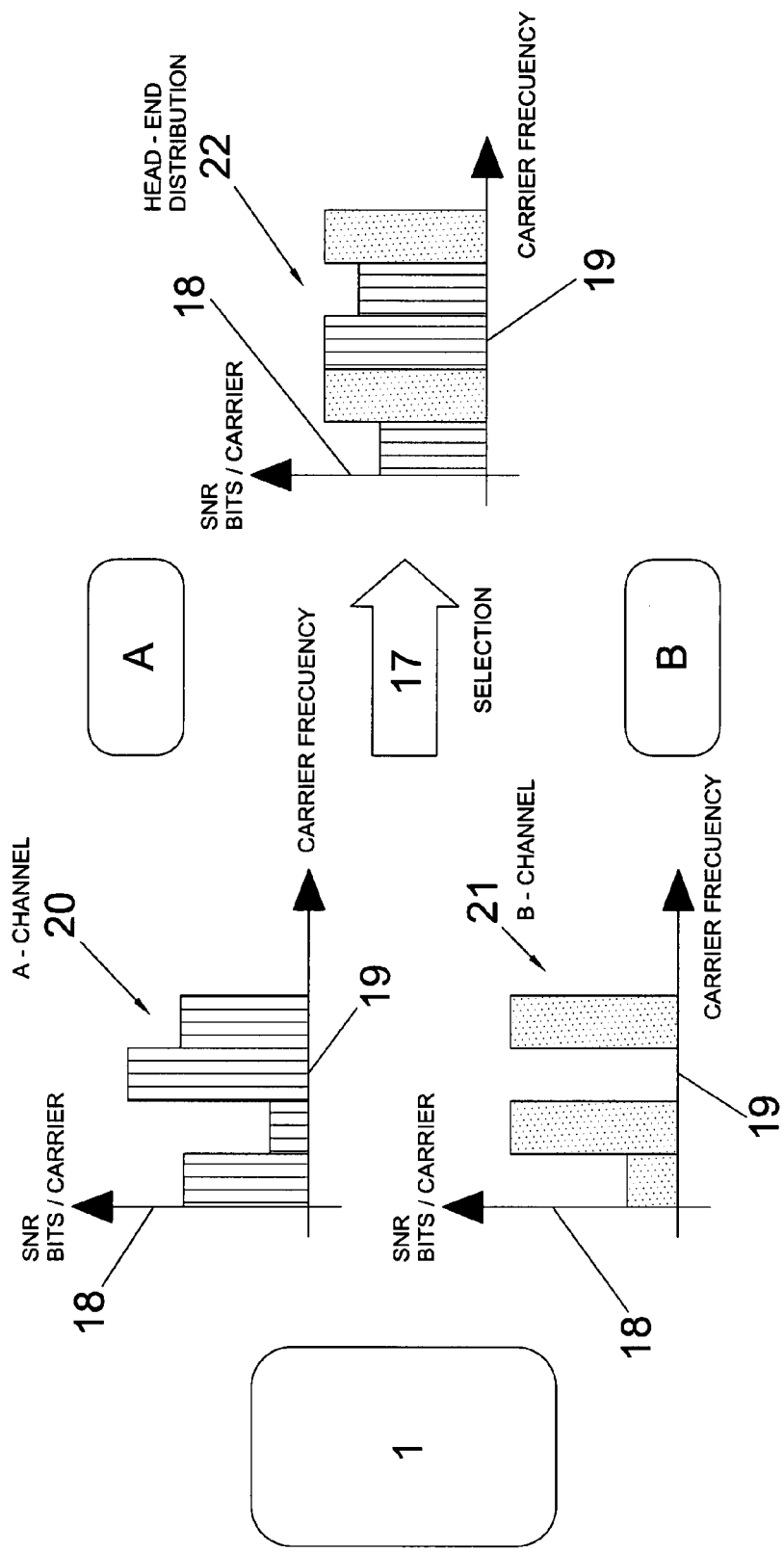
FIG. 4 schematically represents an example of the assignation of carriers by the downstream channel in a system used by the process described in the present invention.

FIG. 4 shows a graphic representation of the assignation of carriers for a downstream channel and the sending of information from the head-end kit 1 to some users A and B. The axis 18 and 19 represent respectively the signal-to-noise ratio, or bits per carrier and carrier frequency. The graphic 20 represents the channel observed in the direction of user A, that is, the channel response in the carriers in the downstream connection in terms of S/N or bits per carrier supported by user A that the head-end uses to optimise the transmission for this user while the graphic 21 represents the channel observe in the direction of user B. The distribution selected 17 by the head-end kit 1 is represented by the graphic 22.

When the head-end kit 1 wants to transmit to a specific user it uses one of the subchannels and advises of the destination and uses the sub channel by means of the packet header sent by this sub channel. The users decode the header that indicates that a packet is directly to them and decode the corresponding data Only the head-end 1 can transmit in the downstream to one or various users (A, B, ... X). The head-end 1 may reorder the packets that must be sent to the various users to guarantee a determined QoS, even though it can also function in burst mode, that is, directly queuing the packets to be sent once the upper layers have determined what must be transmitted.

In the downstream connection packets are sent using one or various subchannels into which this connection is divided. In each sub channel the fact that a packet is to be sent to a user is indicated by means of the headers already mentioned. In addition to being able to use a sub channel to transmit a different packet to a new user, the carriers in this sub channel can be used to speed up the transmission of information of a packet that has already been sent by another sub channel (aggregating the carriers of this sub channel to the sub channel that sent the initial packet with thereby accelerating the transmission of this packet). To indicate that a sub channel will be used as aggregate to accelerate the transmission, an information packet is sent by the aggregate sub channel with a header directed to the affected users.

The users observe the whole of the downstream connection looking for packets whose headers indicate that the packets are directed to them. These headers must be correctly decoded or interpreted for each one of the users in the system therefore this part of the packet must have very low S/N needs for decoding. For this, one can use secure modulations such as BPSK or QPSK, along with robust correction/error detection codes, as well as diversity in time and frequency.

When a user decodes a header indicating that a packet is directed to it, it will know the corresponding sub channel or subchannels used to send the packet and it will take the data sent by these subchannels. If the header is not directed to it, it simply ignores the data associated with the header. If the header indicates that a new sub channel is being used to speed up the sending of a packet, it will decode the information that arrives via the new carriers as well as by the carriers in the original sub channel to obtain the information in the channel. By this means dynamic assignment of bandwidth is achieved in the downstream connection.

The use of headers is of great importance in the system as it allows a packet to be self-contained. The header contains all the information necessary about a packet such as destination, size, type of packet, if it has diversity in frequency or time, if it is in multicast mode (this mode indicates that it will be received by multiple users), etc. In the upstream channel it is necessary to use an extra mechanism to know when to be able to send the packets, that is the distribution of SLOTS by the arbiter 5 and the SLOT assignation messages to communicate the distribution to the users.

Figure 5:
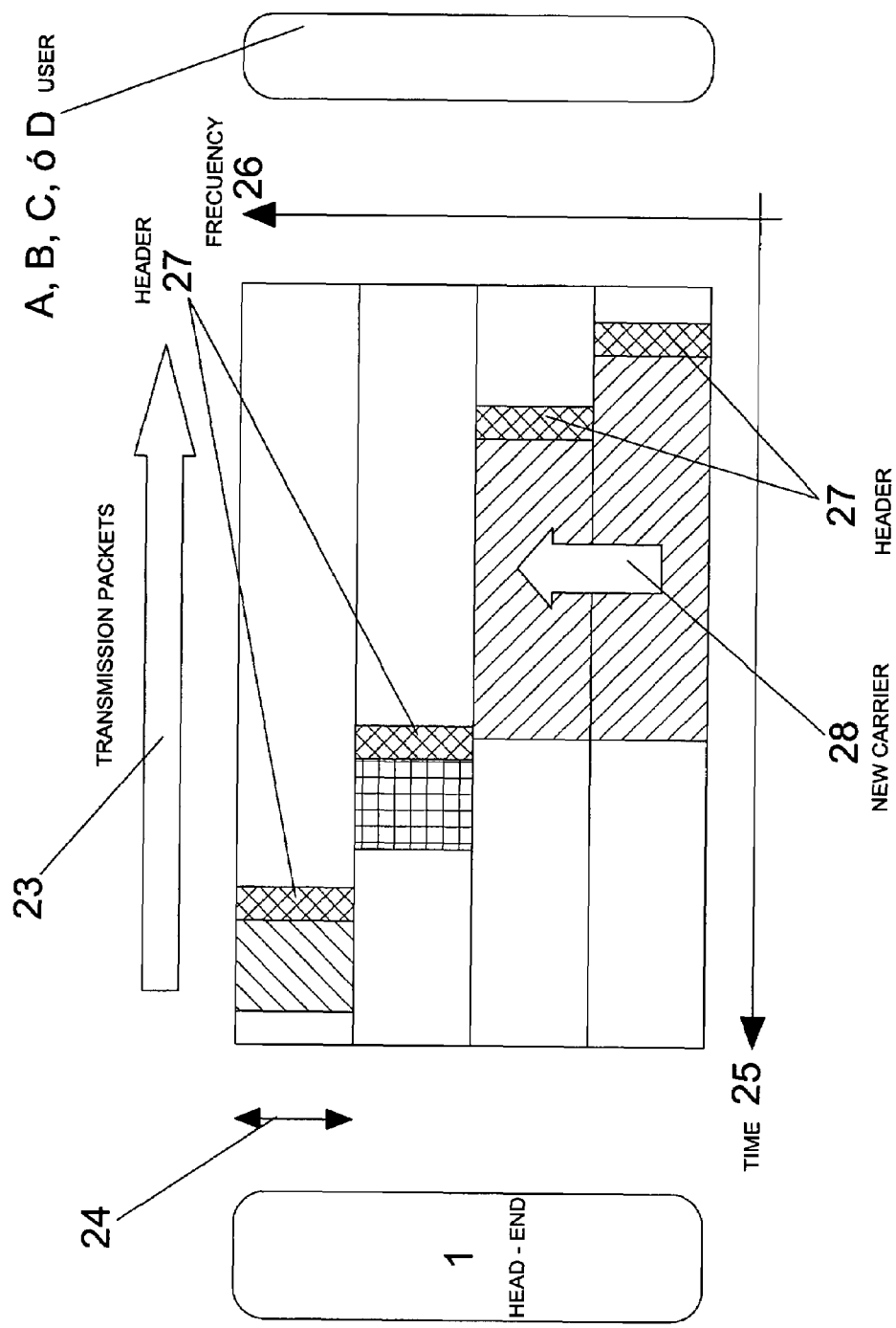
FIG. 5 schematically represents the transmission of packets with headers for each sub channel in a downstream channel of a system that uses the process of the present invention.

FIG. 5 shows an example where four subchannels are used 24 in the downstream connection. From this FIG. 5 it can be appreciated that the first and second subchannels, counting from the top, send packets that are preceded by a header 27. In the fourth sub channel the transmission of a packet begins and previously, the third sub channel is used to accelerate the transmission of the same packet using the new carriers for this, as represented by the arrow 28. This is indicated by means of the header 27 of the third sub channel. The arrow 23 represents the direction of the transmission of packets from the head-end kit 1 to the user A, B, C or D. The axis 25 and 26 represent time and frequency respectively.

For transmission in the upstream connection or channel, the channel is logically divided into time and frequency intervals known as SLOTS (as mentioned previously) to allow multiple users transmit simultaneously over the electricity network 2 in the direction of the head-end 1. Thanks to this structure bandwidth can be dynamically assigned so that more or less time SLOTS (symbols) or frequency SLOTS (carriers) may be granted, so that the users can transmit information with different quality requirements (both bandwidth and latency) and optimising the transmission by granting SLOTS to the users that observe sufficient signal-to-noise ratio on the sub channel so as to use the most dense modulations.

When one of these SLOTS is assigned to a user kit (A, B, . . . X), the user will know during what moments or time and in which carriers (and therefore in which frequency) it can send the information that it wants to transmit. The group of carriers associated with a SLOT is known as a sub channel in the upstream connection. The frequencies in each sub channel are adjusted to the coherent bandwidth of the channel so that each user observes a similar frequency response (arranged between certain limits) in each sub channel. This allows the capacity of the upstream channel to be increased.

Figure 2:
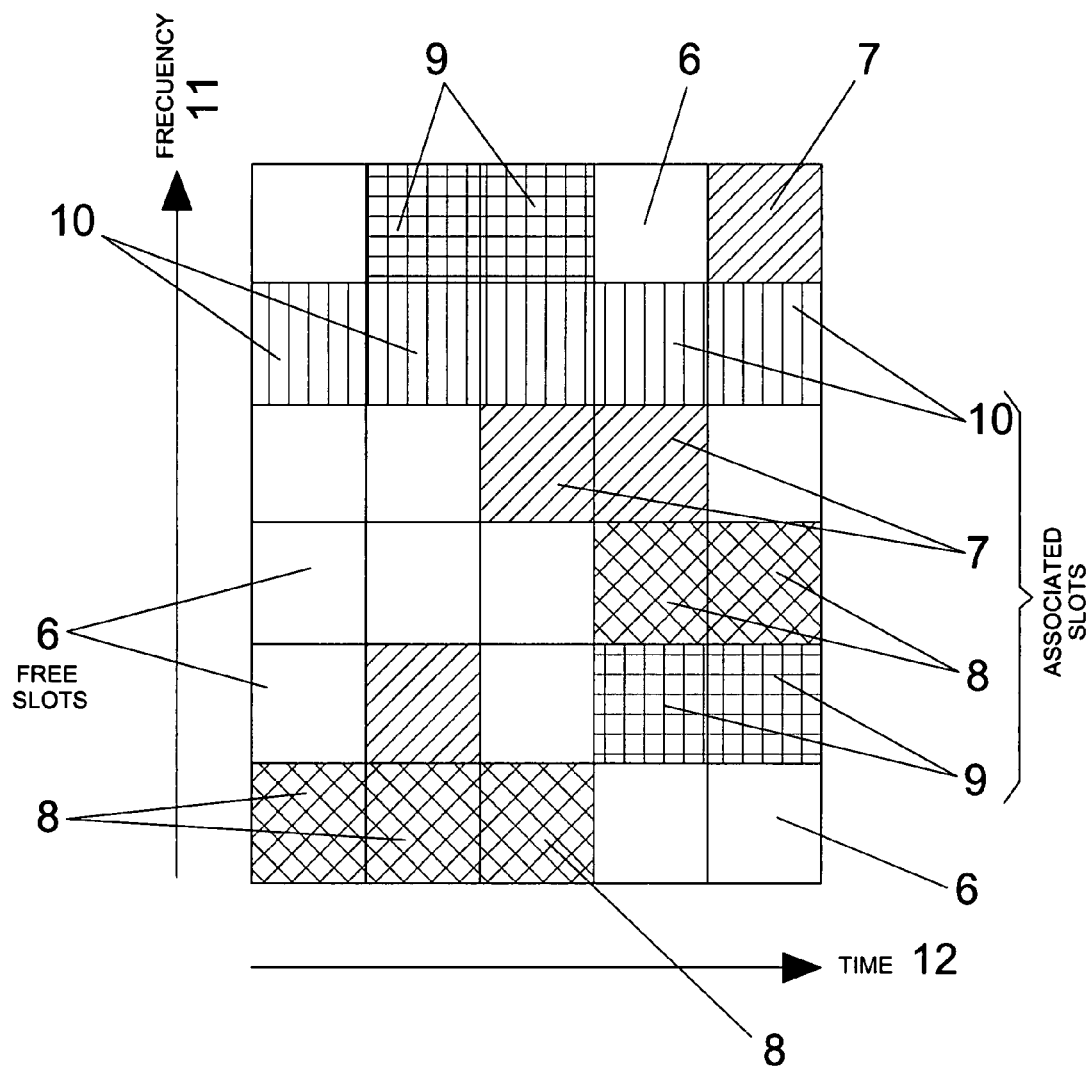
FIG. 2 schematically represents the division of time and frequency of SLOTS by the upstream channel using an example of the present invention.

FIG. 2 shows an example of SLOT distribution in a determined moment for a possible implementation. The axis 11 and 12 represent frequency and time respectively, while the SLOTS 7, 8, 9, and 10 represent SLOTS associated with different users A, B, C and D respectively, while the SLOTS 6 represent SLOTS that are free.

The SLOTS referred to can be put to various uses by the user kits (A, B, . . . X) such as:
  the transmission of requests to interrogation messages (POLLING);
  the transmission of resource petition messages (MPR),
  the transmission of data including one or all of the following:
    1. synchronization sequences,
    2. equalization sequences,
    3. sequences to estimate signal-to-noise ratio, and/or
    4. information data that the user (A, B, . . . X) wants to send to the head-end 1.

By means of SAM messages assigning SLOTS, the head-end 1 indicates the purpose of each SLOT and which user or users can make use of it. In this context, the multiple access system is a central system, where the user kits (A, B, . . . X) only transmit over the electricity network 2 when the head-end 1 previously decides and communicates the decision to the users implicated along with the quantity of information that can be transmitted, the type of modulation, etc.

To optimise the use of the upstream channel in the access to the electricity network 2 with OFDMA/TDMA/CDMA, the three controls previously mentioned have been developed, thanks to which the signal-to-noise ratio is maximized for all users without penalizing one over the other for transmitting.

With regard to control over injected power, an automatic gain control and/or a power mask is used so that the signals of the user kits (A, B, . . . X) arrive at the head-end kit 1 with approximately the same power, so that it is possible to work with A/D converters of very few bits without losing the signal-to-noise ratio in reception.

The time window control is used to ensure that the signals from the various user kits (A, B, . . . X) arrive at the head-end kit 1 at the same time, that is that the start of all the OFDM symbols sent arrive in the same time window at the head-end 1, making the control by:
  an adjustment in the open loop that occurs in the downstream channel, and which represents a rough adjustment in the time window and in which each user kit can see the packets that arrive via the downstream channel, and from which the samples that have to be delayed/advanced in transmission are approximately deduced so that they arrive at the head-end 1 at the optimum moment;
  an adjustment in the closed loop that occurs in the upstream channel and in the downstream by means of the SAM messages that represent a fine adjustment in the time window and in which the head-end kit 1 detects and communicates the number of samples that must be delayed/advanced by the user kit to reach the optimum moment for transmission.

With respect to the frequency control following synchronization, each user kit (A, B, . . . X) obtains the sample frequency used by the head-end 1, which it then uses to correct the transmission in the upstream channel so that frequency error in reception in the head-end 1 is null; the following methods are used to correct transmission frequency in the users kits (A, B, . . . X):
  residual error correction in the carriers by means of a rotor, that compensates the rotation that each carrier suffers (multiplying each carrier by the complex exponential of the desired angle); and
  sample frequency correction by means of a frequency corrector element (that may consist of a resampler in the digital treatment part of the system, and/or in the variable oscillator or VCXO in the analog part), it being considered that if the corresponding clocks are sufficiently precise it is not necessary to use said frequency corrector element, it being sufficient simply to correct the residual error in the carriers with the rotor previously referred to.

In the upstream connection and in CDMA multiplexing a frequency hopping method is used that if applied to the carriers in which the user kits (A, B, . . . X) in the moment of transmission only use some of the carrier according to a sequence that indicates at each instant the carriers that may be used to send information, this sequence being predefined and being capable of being generated by a pseudorandom sequence whose seed is communicated by means of SAM messages, while if the said method is applied to the subchannels, the sequence is used to indicate to the user kit (A, B, . . . X) which sub channel must be used to transmit at each moment in time.

One of the advantages of "frequency hopping" is that the subchannels or the carriers are distributed to the users over time, that is, a user does not use a sub channel with high signal-to-noise ratio, all the time, rather, it also uses (when the sequence indicates it) channels with low signal-to-noise ratio, so that on average all the users see an average channel and thereby maximise the transmission bandwidth for the electricity network.

Figure 6:
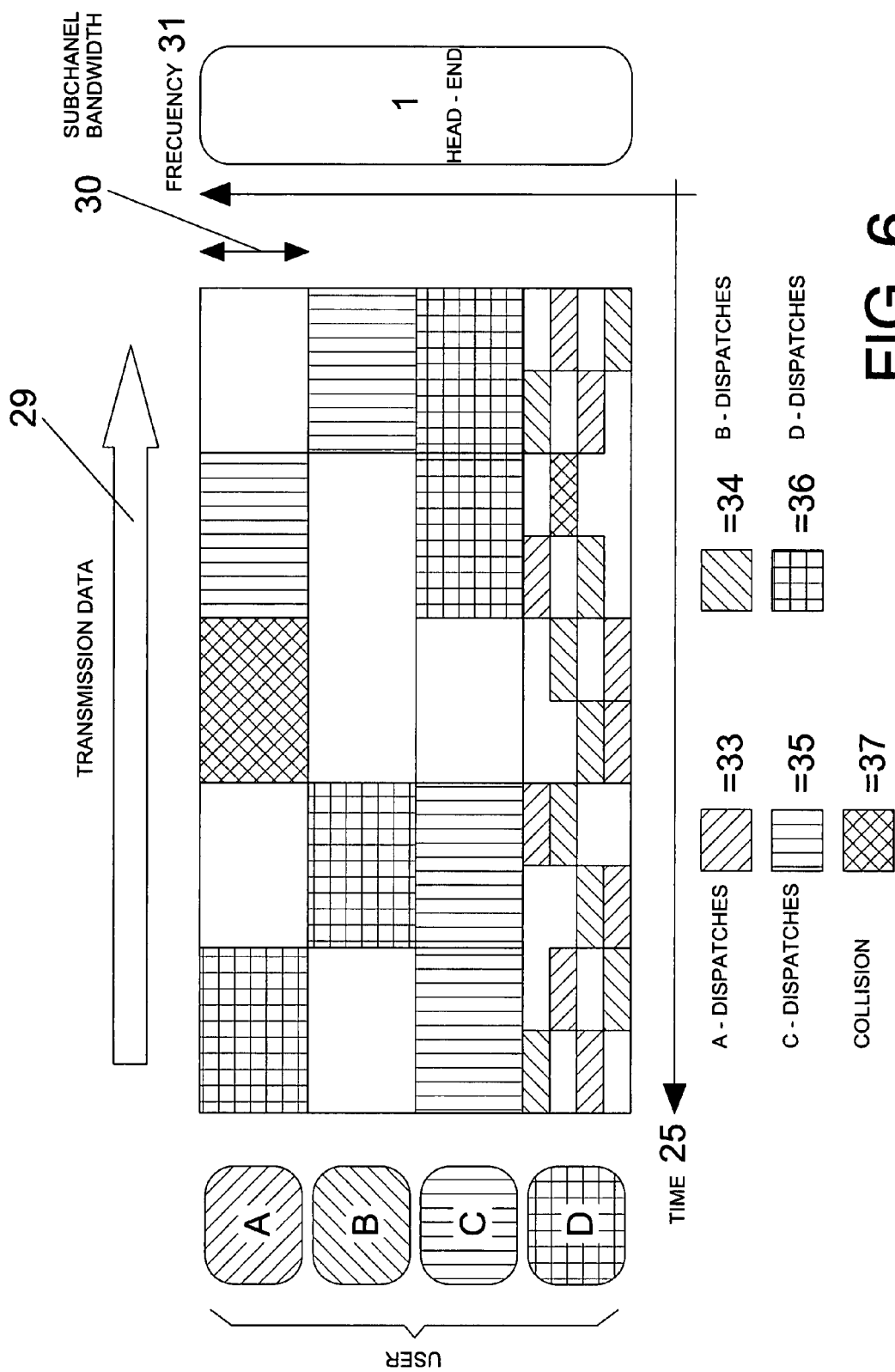
FIG. 6 schematically represents the use of the frequency hoping method in an upstream channel of a system that uses the process described in the present invention.

FIG. 6 represents an example of frequency hoping for a communication between some user kits A, B, C, and D in the direction of a head-end 1; where the arrow 29 represents the direction of the transmission of data, while the arrow 30 represents the bandwidth of each sub channel. The axis 31 and 32 represent frequency and time respectively. The references 33, 34, 35 and 36 represent dispatches from the users A, B, C and D respectively, while the reference 37 represents a collision between users.

The SLOT assignation messages SAM are messages that are periodically transmitted by the downstream channel and are decoded by all the users. Their periodicity depends on the size of the SLOTS that the upstream channel is divided into. Once the size of the frequency and time intervals (SLOTS) is selected, the periodicity must be constantly maintained.

The purpose of the SAM messages is to:
announce or identify the user kit or kits (A, B, . . . X) that have been granted transmission in each one of the frequency and time SLOTS that the upstream channel is divided into;
indicate the use which this SLOT must be put: transmission, equalization, S/N, synchronization, data, interrogation (POLLING), resources requests (MPR), etc.
send additional information to the resource request reception, limit access to groups of users, etc.

The SAM messages are essential to construct a system with dynamic assignation of bandwidth. When the users need to transmit information, they make a request to the head-end 1 (using the methods of resource request or interrogation). The head-end 1 does not grant a fixed bandwidth to the user, rather it makes a dynamic distribution of bandwidth, offering more or less SLOTS to the users that make the request according to factors such as quantity of information to be sent, the quality of service requested, the type of information to be sent, the signal-to-noise ratio observed by the users in the SLOTS granted, etc.

Sharing by means of OFDMA is undertaken so that the dynamic allocation of bandwidth is the most efficient possible. With this type of sharing, various users may transmit information using different carriers within the one OFDM symbol.

The SLOT assignation messages may carry information on one or, more SLOTS. Due to the importance of these SAM messages, they also carry preferably, some system to protect against errors such as codes with a large capacity to correct/detect errors, diversity in frequency and/or time, etc. Obviously, the messages to assign SLOTS always temporarily precede the SLOTS in the upstream channel to which they refer.

Furthermore, the SAM messages may indicate if the SLOT assigned to a user is the first, the last or one of the intermediates. If the SLOT is the first of those granted to a user to send information, data will not be sent in all the symbols of the SLOT but rather various symbols of the SLOT must be used to send supplementary information, such as synchronization or equalization. If the SLOT is an intermediary it may be used in its entirety to send data. If it is the last SLOT assigned to a user kit (A, B, . . . X) it sends information and a message to petition resources (MPR) so that the head-end kit 1 knows if it wants to send more information or not. This is not the only time that a kit may send resource petition messages, these may also be sent when the user has information to send and from the head-end kit 1 the purpose of the next SLOT is indicated to be the petition of resources.

In the current example the SAM messages that are sent by the downstream channel in the direction of each user (A, B, . . . X) include, at least, the following information:
indicating the user kit or kits (A, B, . . . X) to which each SLOT has been granted;
indicating the use which this SLOT must be put;
the number of symbols that each kit may use in the SLOT,
the number of the symbol starting from which a certain user may transmit in the SLOT,
information on the modulation that must be used to transmit data,
Furthermore, said SAM messages may include:
the confirmation of reception of messages MPR,
restriction of access to certain user kits (A, B, . . . X),
the correction of deviations in the transmission time window of the user kits (A, B, . . . X),
information on power control,
the type and number of data to be sent by the user, that is what is to be sent is 0 or more symbols of equalization, synchronization, estimation of sound/noise ratio and/or information data.

On the other hand, the MPR messages that have been referred to on various occasions previously, are relatively short control messages that provide information on whether a user kit (A, B, . . . X) wants to transmit data and optionally, on the size of the information block to be sent and the quality of service desired by a user kit (A, B, . . . X), and they are sent at different moments. Said moments are:
when a SAM messaged received by a user kit (A, B, . . . X) indicates that a following SLOT assigned to said kit is the last in a series of SLOTS for the transmission of data, so that the user kit (A, B, . . . X) can utilize part of the SLOT to send an MPR message in case it has more data to transmit;
when a user kit (A, B, . . . X) has been assigned by means of a SAM a SLOT dedicated to the petition of resources so that the user kit or kits (A, B, . . . X) that wish to transmit send their MPR into this SLOT;

When a user kit (A, B, . . . X) has data to transmit it waits until a SAM message announces that some of the following SLOTS are destined for POLLING or MPR, so that if it receives a POLLING SAM, it undertakes the following steps:
the user kit (A, B, . . . X) verifies certain bits in the SAM that indicate if it pertains or not to the group of user that can use the following POLLING SLOT;
the SAM message indicates the positions in which the user kit (A, B, . . . X) must reply to the resource request, these positions being determined by the head-end kit 1, which constantly monitors the signal-to-noise ratio that the user kit (A, B, . . . X) may see in the various available carriers in the upstream connection;

the POLLING SLOT is divided into various valid zones that are small portions of time/frequency, and the user kits (A, B, . . . X) select the zone indicated by the SAM to avoid a collision of petitions;

the user kit (A, B, . . . X) send a POLLING message in the selected zone and if said POLLING has been received by the head-end 1, the user kit (A, B, . . . X) will later receive SAM messages assigning SLOTS; while if it has not been received, the user kit (A, B, . . . X) will have to wait for a new POLLING SAM.

On the other hand, when it receives an MPR SAM, the user kit (A, B, . . . X) sends an MPR message in the corresponding SLOT, where apart from the necessity to transmit is indicated, preferably, the quantity of information to be sent, the priority, the QoS required, the form in which this information may be decoded by the head-end and if it may be used to optimise the algorithm for SLOT assignation of the arbiter 5; if having previously foreseen that the head-end 1 detects a collision, a collision resolution algorithm is undertaken the user kits (A, B, . . . X) transmit their petitions in the next MPR SLOT or POLLING, because the arbiter 5 will not grant them any transmission SLOT in the following SAMs.

In the present example, when a user kit (A, B, . . . X) wants to transmit, it follows the decisions taken by the head-end kit 1 regarding the moment for transmission, the carriers to use, the type of modulation and other parameters by means of the following process:

Following correct reception of a transmission request from a user kit (A, B, . . . X), the head-end kit 1 assigns sufficient time/frequency SLOTS beginning from an estimation realized depending on the activity, transmission capacity, quality of services and other parameters of the user (A, B, . . . X) that made the petition and according to the monitoring of the signal-to-noise ratio as observed in each sub channel, the arbiter 5 being responsible for the distribution of SLOTS between the users that have made the petition to send data by means of an algorithm.

When a user (A, B, . . . X) detects, by means of demodulating and decoding a SAM message that one or more SLOTS are destined for it, it undertakes the following operations:

1. verifies the type of each one of the SLOTS that it has been assigned and the modulation that it must employ in each carrier in each SLOT, where the SAM message is responsible for communicating this information according to that assigned by the arbiter 5.
2. Calculates how many bits it will be able to transmit in total (and extracts the data from its memory) which may be data on information, equalization, synchronization, estimation of the signal-to-noise ratio or any other combination of these, as indicated in the SAM message of assignation of this SLOT.
3. Waits until the start time of the SLOT begins and transmits the data in the carriers of the SLOT with the required modulation.
4. If any of the assigned SLOTS is of the type diversity in time or in frequency, the user kit (A, B, . . . X) has to transmit the modulated information in secure form, preferably QPSK, and to repeat transmission a number of times in frequency, that is to say, transmitting the same information from the carrier k in the carriers k+N, k+2*N, etc., depending on the diversity employed and the carriers assigned or repeated various time's in various moments (diversity in time).
5. If the SLOT is of the POLLING or MPR type the process previously mentioned is undertaken.

The invention claimed is:

1. Process for multiple access and multiple transmission of data point to multipoint over the electricity network, comprising various user kits (A, B, . . . X) and a head-end (1) in two way communication by means of the electricity network (2), where the upstream channel is that which runs from the user kits (A, B, . . . X) to the head-end (1) and the downstream channel that which runs from the head-end (1) to the user kits (A, B, . . . X), and each one of the kits (A, B, . . . X), (1) contains a medium access controller (MAC) (3,4) to maximize the quantity of information that the user kits (A, B, . . . X) can transmit and to minimize time latency in these kits (A, B, . . . X); and where the electricity network is divided for the upstream and downstream channels by frequency division duplexing (FDD) and/or time division duplexing (TDD), comprising:

Accessing the medium by various user kits (A, B, . . . X) in the upstream channel and the simultaneous sending of various information links by the head-end (1) in the downstream channel by means of multiplexing OFDMA/TDMA/CDMA, multiplexing by orthogonal frequency division, multiplexing by time division and or multiplexing by code division;

dynamically assigning each carrier in the OFDM system, multiplexing by orthogonal frequency division, to the user, and between the users with information to send at that moment with greater transmission capacity in this carrier, more bits per carrier or better signal-to-noise ratio, so as to maximize the transmission capacity in both the upstream and downstream channels, that is, to equalize or level the response in frequency observed by the head-end in both emission and in reception;

adjusting quality of service (QoS) depending on the type of information and the users that require the transmission, where this quality of service is adaptable according to the frequency response at different moments and to the different distances between the user kits (A, B, . . . X) and head-end kit (1);

dynamically assigning available bandwidth between the various communication requests by constantly calculating and monitoring the signal-to-noise ratio observed by the user kits (A, B, . . . X) and by the head-end kit (1) over the whole bandwidth of the system; so that transmission resources, this is the combined number of carriers in the system OFDM, are distributed according to the transmission needs at each moment in time for each user, the quality of service (QoS) parameters established for this user, the criteria to maximize the total capacity of the system and the criteria to minimize transmission latency, using for this the redistribution of the carriers of one symbol between the users (OFDMA), in time (TDMA), that is symbol to symbol, and by code (CDMA), optimising said redistribution by constant monitoring of the quality parameters for the electricity line, which vary constantly.

2. Process for multiple access and multiple transmission of data point to multipoint over the electricity network, according to claim 1, comprising maximization means, to equalize or level the frequency response seen by the head-end kit (1) both in emission and reception; where said maximization as mentioned consist of:

specification for a vector space of equal size to the number of carriers in the OFDM channel, where the elements that make up this space are the number of bits per carrier that each user can see in each one of the carriers or the dimension of the constellation used in each carrier; $v_i = [v_{i1}, v_{i2} \ldots v_{in}]$ where N is the total number of carriers utilized in the communication link which refers to the vector and $v_{ix}$ represents the number of usable bits per carrier in the communications from or to the user $_i$, depending on which link is referred to, in the carrier $_x$ from the point of view of the head-end;

distribution of the carriers between the users with information to send so as to maximize the norm one for this vector: $\|v\|$, where v the vector of bits per carrier, or dimension of the constellation or each carrier, that each head-end kit uses in the current symbol, both in the upstream and the downstream;

grouping of the total number of carriers N, of the upstream and downstream in subchannels of the M carriers to simplify the calculation of the algorithm and the implementation, so as to reduce the dimension of vector space, generating a vector space with the dimensions N/M, where the values of the coordinates are the sum of all the carriers in the sub-channel, and giving as a result the capacity of transmission per OFDM symbol that each user sees in each sub-channel;

adjust the width of the subchannels to the coherent bandwidth, defined as the difference of the frequencies between the frequency position of the first and last carrier in which the variation in the frequency response in these carriers is less than a certain threshold.

3. Process for multiple access and multiple transmission of data point to multipoint over the electricity network, according to claim 1, comprising the MAC (4) in the head-end (1) includes an arbitration block (5) or arbiter responsible for the dynamic distribution of bandwidth in the upstream and downstream channels for the various communications from the user kits (A, B, . . . X) where the criterion used by this arbitration block to dynamically assign, the transmission bandwidth are those previously described, and for which the following means are employed:

packet oriented transmission, preceeded by a header indicating to which user the transmission is directed and in which conditions;

upstream and downstream channels are divided into subchannels so that users are multiplexed to maximize bandwidth transmission for both the upstream and downstream channels, using the criteria of orthogonal transmission capacity in function of frequency and the various users;

dynamic assignation, that is varying over time, of carriers to the various users, so that:

in the downstream link the headers of each packet sent by the sub channel indicates, among other things, the destination, the size and the constellation used, so that the users must be capable of detecting and understanding all the headers received by whatever subchannel, while only demodulating the information from the packet directed to them knowing the vector of bits per carrier used in the modulation;

in the upstream link, apart from the division in subchannels adjusted to the coherent bandwidth, division in time occurs such that a SLOT is defined as the number of symbols in the upstream channel between two allocation messages of these SLOTS (SAM), and which constitute the units used by the arbiter (5) to assign resources to the users, where these resources are periodically assigned by sending allocation messages, known as SAM, by the downstream link towards a user kit (A, B, . . . X), which may include information of one or more SLOTS and which are periodically sent to a determined number of samples before the SLOTS to which they refer, that is, they precede them temporarily, so that if the number of symbols of a SLOT is small then the latency floor that can be obtained is also small but the complexity of the system is greater as is the cost of the transmission capacity in the upstream channel in resources allocation messages (SAM);

continuous measuring of the signal-to-noise ratio for each user in all the upstream as well as downstream channels, to continually update the capacity of the transmission for all the users in each one of the subchannels;

continuous information regarding which users (A, B, . . . X) wish to make transmission and in what quantities by means of interrogation, that is to say, by POLLING, SLOTS and resource petition messages (MPR) respectively, where the upper layers of the head-end (1) in the upstream are those that inform the arbiter (5) of the quantity of information pending transmission and from which users; and, information on the QoS, bandwidth and latency, defined for each user in function of the channel capacity and the number of users hanging from the head-end kit (1), so that the number of SLOTS continuously assigned to a single user can be limited in cases where various users want to transmit at a given moment, thereby maintaining equality of access for users in the upstream connection.

4. Process for multiple access and multiple transmission of data point to Multipoint over the electricity network, according to claim 3, comprising when the head-end kit (1) wants to transmit to one or more user kits (A, B, . . . X) via the downstream channel, the arbiter block (5) dynamically distributes bandwidth, using one or more of the subchannels referred to, and it advises of the destination of use this or these subchannels by means of the headers in the information packets sent by the subchannels, for this each user kit decodes the corresponding data when it detects that one of the said headers refers to a packet directed to it, so a user kit (A, B, . . . X) can receive more than one packet from various distinct subchannels, being able to indicate to this header the transmission of a new packet to the user or that the sub channel where the header is sent will be used to accelerate the transmission of a packet sent previously by another sub channel or subchannels to the same user, by means of aggregating the carriers of this new sub channel and those already used for the transmission of the previous packet.

5. Process for multiple access and multiple transmission of data point to multipoint over the electricity network, according to claim 4, comprising headers sent by the subchannels in the downstream connection are modulated preferably with modulations that have few signal-to-noise ratio requirements for their decoding, preferably DPSK, differential phase modulation, and/or QPSK, quadrature phase modulation, along with error correction/detection codes and frequency diversity, sending of the same information in different carriers, and/or time diversity, sending the same information at different moments, to increase the probability of correctly decoding the said header.

6. Process for multiple access and multiple transmission of data point to multipoint over the electricity network, according to claim 4, comprising the headers already referred to include all the information necessary for the appropriate information packet, such that the destination, packet types, the use of diversification in frequency and/or in time, if the packet is destined for one user or for various users, MULTI- CAST mode, and or all users, BROADCAST mode, the modulation used for each carrier, if FEC redundancy has been employed, error correction/detection code, to protect the information packet, and/or if the sub channel to which the header is sent will be used to accelerate the transmission of information from a packet sent previously by another sub channel, or other information.

7. Process for multiple access and multiple transmission of data point to multipoint over the electricity network, according to claim 3, comprising the SLOTS where the upstream connection is divided, may be used by the user kits (A, B, . . . X) for:
   the transmission of requests to interrogation messages, POLLING;
   the transmission of resource petition messages (MPR),
   the transmission of data including one or all of the following:
      synchronization sequences,
      equalization sequences,
      sequences to estimate signal-to-noise ratio, and/or
      data on information that the user (A, B, . . . X) wants to send to the head-end (1).

8. Process for multiple access and multiple transmission of data point to multipoint over the electricity network, according to claim 3, comprising in the upstream connection the arbiter (5) of the head-end (1) includes the means to provide each user kit (A, B, . . . X) with the most adequate bandwidth in variable form, offering more or less SLOTS according to parameters such as the amount of information to be sent, the quality of service requested, the type of information to be sent, the signal-to-noise ratio observed by the users in the SLOTS conceded, and others, by means of an optimum assignation algorithm of SLOTS and communicating the decisions taken by said arbiter (5) to the user kits (A, B, . . . X) using SAM messages.

9. Process for multiple access and multiple transmission of data point to multipoint over the electricity network, according to claim 3 comprising the method used to communicate decisions on the distribution of SLOTS in the upstream connection as taken by the arbiter (5) of the head-end (1) is the sending of assignation messages SAM by the downstream connection to each user kit (A, B, . . . X), and can include information on one or various SLOTS, be sent periodically and always with a determined number of samples before the SLOTS to which they refer, that is, they temporarily precede them, including at least:
   the indication of the user or users (A, B, . . . X) to which each SLOT is given,
   to indication of the use to which each SLOT is to be put,
   the number of symbols inside the SLOT that will be given to each user,
   the number of the symbol starting from which each user may use the SLOT,
   information on the modulation that must be used for the transmission of data, preferable QPSK or a constellation negotiated with the head-end kit (1) for a determined error task in function of the signal-to-noise ratio in the channel;
it may also include:
   confirmation of reception of resource petition messages (MPR),
   restriction of access to determined user kits (A, B, . . . X),
   the correction of detours in the temporal transmission window of the user kits (A, B, . . . X),
   information on power control,
   the type and number of data to be sent by the user, that is if 0 or more equalization or synchronization symbols are to be sent and an estimation of the sound/noise and/or the data in the information where these SAM messages are preferably coded with some extra protection against errors, such as codes with a greater capacity for correction/detection of errors, diversity in frequency or time, and other systems.

10. Process for multiple access and multiple transmission of data point to multipoint over the electricity network, according to claim 3, comprising in the downstream channel, the arbiter (5) undertakes the distribution function taking into account parameters such as the signal-to-noise ratios, or the frequency response, that the user kits (A, B, . . . X) observe in the subchannels, the message priority, the quantity of information, among others; while the users decode the headers sent via the downstream connection and decide if they must take the data sent by the same sub channel as the header, starting from the information on the destination, including said header.

11. Process for multiple access and multiple transmission of data point to multipoint over the electricity network, according to claim 10, comprising the arbiter (5) may order the use of one or more additional subchannels for the corresponding dispatch, or to increase the bandwidth of a user, the objective being to speed up the transmission of the packet referred to, assigning more than one sub channel to transmit more than one packet of information at a time, indicating either of these decisions by means of the header in the messages dispatched.

12. Process for multiple access and multiple transmission of data point to multipoint over the electricity network, according to claims 10, comprising the arbiter (5) may distribute the users (A, B, . . . X) on the various subchannels, in both the upstream and the downstream, such that the bandwidth used is maximised at each moment, based on the frequency response that each user (A, B, . . . X) may observe in the various subchannels.

13. Process for multiple access and multiple transmission of data point to multipoint over the electricity network, according to claims 9, comprising for the upstream and downstream channels, the arbiter (5) uses QoS as one of the criteria, at the time of assigning resources to minimize latency, that is, each user kit (A, B, . . . X) transmits as soon as possible after placing an access request in the upstream connection, or that a packet is transmitted from the head-end kit (1) to a user (A, B, . . . X) as quickly as possible.

14. Process for multiple access and multiple transmission of data point to multipoint over the electricity network, according to claim 3, comprising the MPR message, is preferably a relatively short control message to inform if a user kit (A, B, . . . X) wants to transmit data and optionally of the size of the information block to be sent and the quality of service required by the user kit (A, B; . . . X) during the following moments:
   when a SAM message received by the user kit (A, B, . . . X) indicates that the next SLOT assigned to said kit is the last in a series of data transmission SLOTS, the user kit (A, B, . . . X) uses part of the SLOT to send an MPR message in case that it has more data to transmit,
   when the user kit (A, B, . . . X) has not more data to send and still has SLOTS assigned, in this case the corresponding MPR message will indicate to the head-end (1) not to assign to it more SLOTS and to reassign the remaining SLOTS to other user kits (A, B, . . . X),
   when a user kit (A, B, . . . X) is assigned a SLOT, by means of a SAM, dedicated to the petition of resources (MPR), so that the user kit/s (A, B, . . . X) that want to transmit, send their MPR to this SLOT, using a small part of this randomly or by means of a determined algorithm that takes into account the type of user, the type of information and other parameters; and the manner in which the head-end kit (1) detects possible collisions when various user kits coincide in the petition of resources in the same zone of the SLOT, such collisions are resolved by means of algorithms known in the prior art or by leaving the user kits (A, B, . . . X) retransmit their positions in later intervention until competition between users (A, B, . . . X) is resolved.

15. Process for multiple access and multiple transmission of data point to multipoint over the electricity network, according to claim 3 comprising, said POLLING SLOTS allow a maximum number of users (A, B, . . . X) to be questioned on whether or not they have information to transmit by using an interrogation algorithm the purpose being that the same user kits (A, B, . . . X) are not always those questioned when said maximum number is surpassed, including in the head-end (1) itself means to classify the user kits into various categories depending on the activity that the users demonstrate, and to obtain this information the head-end (1) assigns interrogation SLOTS, POLLING, to those users on whose activity it requires information and these respond in the part of the SLOT allocated to them when they have information to send.

16. Process for multiple access and multiple transmission of data point to multipoint over the electricity network, according to claim 7, comprising when a user kit (A, B, . . . X) has data to send it waits until a message (SAM) announces that one of the following SLOTS is destined for POLLING or MPR, so that if it receives a POLLING SAM the following steps are taken:
    the user kits (A, B, . . . X) verifies certain bits in the SAM that indicate if it belongs or not to the group of users than may use the next POLLING SLOT,
    the SAM message indicates the positions in which the user kit (A, B, . . . X) must reply to the resource request, these positions being determined by the head-end kit (1) that constantly monitors the signal-to-noise ratio and that can be seen by user kit (A, B, . . . X) in the various carriers, available frequencies for the upstream communication;
    the POLLING SLOT is divided in various valid zones that are small portions of time/frequency, and the user kits (A, B, . . . X) select the zone indicated by the SAM so as to avoid a collision of petitions;
    the user kit (A, B, . . . X) send a POLLING message in the selected zone; and
    if the said POLLING has been received in the head-end kit (1), the user kit (A, B, . . . X) will later receive SAM messages assigning SLOTS; while if it has not received them, the user kit (A, B, . . . X) will have to wait until there is a new POLLING SAM; while if it has received an announcement of an MPR SLOT in a SAM, the user kit (A, B, . . . X) will send the MPR message in said SLOT where apart from the necessity to transmit, it indicates, preferably, the size of the information that it wants to send, the priority, the QoS required, so said information may be decoded by the header and can be used to optimise the algorithm for the assignation of arbitrage SLOTS (5); having foreseen that if the head-end (1) detects collision it will begin an algorithm to resolve this collision or wait for the user kits (A, B, . . . X) to transmit their petition in another MPR SLOT or POLLING, since the arbiter (5) does not grant any data transmission SLOT in the following SAM.

17. Process for multiple access and multiple transmission of data point to multipoint over the electricity network, according to claim 2, comprising in transmission the user kits (A, B, . . . X) follow the decisions taken by the head-end (1) regarding the moment to transmit, the carriers to be used, the type of modulation and other parameters, according to the following process:
    having correctly received the transmission requests from a user kit (A, B, . . . X), the head-end (1) assigns sufficient time/frequency SLOTS starting from an estimation made according to the activity, transmission capacity, quality of service and other parameters of the user kit (A, B, . . . X) that made the petition and according to the signal-to-noise ratio monitored in the sub channel the arbiter (5) being responsible for the distribution of SLOTS between the users that made the petition to send data with the algorithm previously mentioned;
    when a user kit (A, B, . . . X) detects, by means of demodulation and decoding the SAM message that one or more SLOTS are destined for it, it undertakes the following operations:
        checks the type of each one of the SLOTS assigned and the modulation that must be used in each carrier of each SLOT, the SAM message being responsible for the communication of this information according to that assigned by the arbiter (5);
        calculates how many bits it will be able to transmit in total, and extracts the data from its memory, these being information on data, equalization, synchronization, estimation of sound/noise or any other combination of these, as is indicated in the SAM message assigned to this SLOT;
        waits for the start symbol on the part of the SLOT that must transmit and undertakes the transmission of data with the modulation selected;
        if any of the SLOTS assigned is of the type diversity in time or in frequency, the user kit (A, B, . . . X) must transmit the modulated information in secure form, preferable QPSK, repeated various times in frequency, that is to say, transmitting the same information from carrier k in the carriers k+N, k+2*N, etc, depending on the diversity used and the carriers assigned, or repeated various times at various moments, time diversity;
        if the SLOT is a POLLING or MPR type the process previously specified in claim 16 is used.

18. Process for multiple access and multiple transmission of data point to multipoint over the electricity network, according to claim 1, comprising the CDMA multiplexing, already referred to, includes a frequency hopping method that if applied to the carriers then the user kits (A, B, . . . X) in the moment of transmission only use some of the carrier according to a sequence that indicates at each instant the carriers that may be used to send information, this sequence being predefined and being capable of being generated by a pseudo-random sequence whose seed is communicated by means of SAM messages, while if the said method is applied to the subchannels, the sequence is used to indicate to the user kit (A, B, . . . X) which sub channel must be used to transmit at each moment in time.

19. Process for multiple access and multiple transmission of data point to multipoint over the electricity network, according to claim 3, comprising the information packet headers send by the SLOTS in the upstream connection are modulated, preferably with modulations that for decoding have low signal-to-noise ratio requirements, such as DPSK, differential phase modulation, and/or QPSK, phase modulation in quadrature, along with correction codes/error detection and frequency diversity, sending of the same information over distinct carriers, and/or time, sending the same information at different moments, to increase the probability of correct decoding.

20. Process for multiple access and multiple transmission of data point to multipoint over the electricity network, according to claim 3, comprising the headers, include all the information necessary on the corresponding information packet, such as information on packet type, use of frequency and/or time diversity, the modulation used to modulate the information in the packet, for example all carriers in QPSK or all carriers with the constellation fixed for a determined error rate in function of the signal-to-noise ratio on the channel after each user has been negotiated with the head-end, and the FEC redundancy, code correction redundancy/error detection, with which the information in the packet is protected, among others.

21. Process for multiple access and multiple transmission of data point to multipoint over the electricity network, according to claim 3, comprising a series of controls to maximize the signal-to-noise ratio for all users without penalizing any of the them during the transmission thereby allowing multiple access in the same OFDM symbol and in the upstream connection and the transmission of multiple information packets simultaneously in the downstream connection; said controls being:
   control of the injected power for each user kit (A, B, ... X);
   control of the time window for each user kit (A, B, ... X);
   control of the sample frequency, that is the synchronization in frequency of the user kits (A, B, ... X).

22. Process for multiple access and multiple transmission of data point to multipoint over the electricity network, according to claim 21, comprising automatic gain control and/or a power mask is used on these controls on the injected power by which the signals from the users kits (A, B, ... X) arrive at the head-end (1) with approximately the same power, so that one can work with converters A/D, analog/digital, with few bits without loosing the signal-to-noise ratio in reception.

23. Process for multiple access and multiple transmission of data point to multipoint over the electricity network, according to claim 21, comprising the window control is used to control the signals from the various users (A, B, ... X) that arrive at the head-end (1) at the same time, that is, the start of all the OFDM symbols sent arrive in the same time window at the head-end (1); this control is made by means of:
   an adjustment in the open loop that occurs in the downstream channel, and which represents a rough adjustment in the time window and in which each user kit (A, B, ... X) can see that packets that arrive via the downstream channel, and from which the samples that have to be delayed/advanced in transmission are approximately deduced so that they arrive at the head-end (1) at the optimum moment;
   an adjustment in the closed loop that occurs in the upstream channel and in the downstream by means of the SAM messages that represent a fine adjustment in the time window and in which the head-end kit (1) detects and communicates the number of samples that must be delayed/advanced by the user kit (A, B, ... X) to reach the optimum moment for transmission.

24. Process for multiple access and multiple transmission of data point to multipoint over the electricity network, according to claim 21, comprising, in the said frequency control and following synchronization, each user kit (A, B, ... X) knows the sample frequency used by the head-end (1), which it then uses to correct the transmission in the upstream channel so that frequency error in reception is null; the following methods are used to correct transmission frequency in the users kits (A, B, ... X):
   residual error correction in the carriers by means of a rotor, that compensates the rotation that each carrier suffers, multiplying each carrier by the complex exponential of the desired angle; and
   sample frequency correction by means of a frequency corrector element, that may consist of a resampler in the digital treatment part of the system, and/or in the variable oscillator or VCXO in the analog part, taking into account that if the corresponding clocks are sufficiently precise it is not necessary to use said frequency corrector element, it being sufficient simply to correct the residual error in the carriers with the rotor previously referred to.

25. Process for multiple access and multiple transmission of data point to multipoint over the electricity network, according to claim 7, comprising the method used to communicate decisions on the distribution of SLOTS in the upstream connection as taken by the arbiter (5) of the head-end (1) is the sending of assignation messages SAM by the downstream connection to each user kit (A, B, ... X), and can include information on one or various SLOTS, be sent periodically and always with a determined number of samples before the SLOTS to which they refer, that is, they temporarily precede them, including at least:
   the indication of the user or users (A, B, ... X) to which each SLOT is given,
   to indication of the use to which each SLOT is to be put,
   the number of symbols inside the SLOT that will be given to each user,
   the number of the symbol starting from which each user may use the SLOT,
   information on the modulation that must be used for the transmission of data, preferable QPSK or a constellation negotiated with the head-end kit (1) for a determined error task in function of the signal-to-noise ratio in the channel;
it may also include:
   confirmation of reception of resource petition messages (MPR),
   restriction of access to determined user kits (A, B, ... X),
   the correction of detours in the temporal transmission window of the user kits (A, B, ... X),
   information on power control,
the type and number of data to be sent by the user, that is if 0 or more equalization or synchronization symbols are to be sent and an estimation of the sound/noise and/or the data in the information where these SAM messages are preferably coded with some extra protection against errors, such as codes with a greater capacity for correction/detection of errors, diversity in frequency or time, and other systems.

* * * * *

UNITED STATES PATENT AND TRADEMARK OFFICE
CERTIFICATE OF CORRECTION

PATENT NO.       : 7,460,553 B2                                   Page 1 of 1
APPLICATION NO.  : 10/686046
DATED            : December 2, 2008
INVENTOR(S)      : Juan Carlos Riveiro Insua et al.

It is certified that error appears in the above-identified patent and that said Letters Patent is hereby corrected as shown below:

On the Title page Item (75) 3rd Co-Inventor's name should read,

--FELICIANO GÓMEZ MARTÍNEZ--

Signed and Sealed this

Seventeenth Day of February, 2009

JOHN DOLL
*Acting Director of the United States Patent and Trademark Office*